(12) United States Patent
Ghiondea et al.

(10) Patent No.: US 10,684,846 B2
(45) Date of Patent: Jun. 16, 2020

(54) USING SEMANTIC ANNOTATIONS TO CONTROL COMPATIBILITY BEHAVIORS

(71) Applicant: MICROSOFT TECHNOLOGY LICENSING, LLC, Redmond, WA (US)

(72) Inventors: Gabriel Alexandru Ghiondea, Redmond, WA (US); Mark Allen Miller, Woodinville, WA (US); Preeti Vijay Krishna, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/785,453

(22) Filed: Oct. 17, 2017

(65) Prior Publication Data
US 2019/0114165 A1    Apr. 18, 2019

(51) Int. Cl.
| | | |
|---|---|---|
| *G06F 9/44* | (2018.01) | |
| *G06F 8/658* | (2018.01) | |
| *G06F 8/71* | (2018.01) | |
| *G06F 8/65* | (2018.01) | |
| *G06F 9/445* | (2018.01) | |

(52) U.S. Cl.
CPC ............... *G06F 8/658* (2018.02); *G06F 8/65* (2013.01); *G06F 8/71* (2013.01); *G06F 9/44505* (2013.01); *G06F 9/44552* (2013.01)

(58) Field of Classification Search
CPC .................................... G06F 8/658; G06F 8/71
USPC ........................................................ 717/121
See application file for complete search history.

(56) References Cited

U.S. PATENT DOCUMENTS

| | | | | |
|---|---|---|---|---|
| 6,658,659 B2* | 12/2003 | Hiller | ................. | G06F 9/44536 707/999.202 |
| 7,191,196 B2* | 3/2007 | Perks | ................... | G06F 9/4493 |
| 7,506,336 B1* | 3/2009 | Ninan | ..................... | G06F 8/65 707/999.202 |
| 7,814,471 B2* | 10/2010 | Jodh | ................... | G06F 9/44552 717/163 |
| 8,522,227 B2* | 8/2013 | Santos | ............... | G06F 9/44536 717/162 |
| 2002/0100017 A1 | 7/2002 | Grier et al. | | |

(Continued)

OTHER PUBLICATIONS

"International Search Report and Written Opinion Issued in PCT Application No. PCT/US2018/055121", dated Jan. 24, 2019, 14 Pages.

*Primary Examiner* — Wei Y Zhen
*Assistant Examiner* — Lanny N Ung
(74) *Attorney, Agent, or Firm* — Rainier Patents, P.S.

(57) ABSTRACT

Forward and/or backward compatibility between an invoking program and the invoked program can be maintained by using compatibility indicators and/or annotations to configuration settings that specify the desired behavior of the invoked program. Compatibility indicators and/or annotations can be used to override default behavior to ensure compatibility between a version of a program and a version or revision of a dependency of the program. Annotations can be made to configuration settings or to initialization programs and/or files. Configuration and/or initialization settings for the program can be annotated to indicate when default behavior of the dependency is to be overridden to provide alternate behavior. Configuration settings for the program can be annotated to indicate when future revisions to the dependency are to be applied.

19 Claims, 7 Drawing Sheets

(56) References Cited

U.S. PATENT DOCUMENTS

| | | | |
|---|---|---|---|
| 2007/0038645 A1* | 2/2007 | Koskas | G06F 17/30595 |
| 2008/0320460 A1* | 12/2008 | Miller | G06F 8/71 717/162 |
| 2011/0047536 A1 | 2/2011 | Santos et al. | |
| 2017/0031732 A1* | 2/2017 | Cerny | G06F 9/44505 |

* cited by examiner

USING SEMANTIC ANNOTATIONS TO CONTROL COMPATIBILITY BEHAVIORS

BACKGROUND

A "library" is a collection of program resources. A resource in a library is also referred to as a "library". The value of a library lies in its ability to be written once and re-used any number of times. Resources in the library can be used by multiple independent programs or sub-programs. The resources in the library can include already written code, subroutines, classes, type specifications and so on. If the code of the library is incorporated into the executable during compilation of the invoking program, the library is called a static linked library. Alternatively, during execution, an application may explicitly request to load a particular library resource. A library that is loaded and linked at runtime is called a dynamic linked library. An executable of an invoking program can be distributed independently of the dynamic library resource on which the program depends. When a library or library resource is distributed independently of the executable of the program that invokes the dynamic library resource, incompatibilities between the invoking program and the invoked program can arise.

Software versioning refers to assigning either version names or version numbers to states of computer software. Version numbers are typically assigned in increasing order corresponding to developments in the software.

SUMMARY

Forward and/or backward compatibility between an invoking program and the invoked program can be maintained by using optional revision identifiers that specify the desired behavior of the invoked program. Forward and/or backward compatibility between a program and its dependency can be maintained by using revision indicators that specify the desired behavior of the dependency. A user-defined compatibility indicator that controls compatibility behavior of a dependency of an invoking program can be accessed. The compatibility indicator can include an identifier of the dependency and an optional revision identifier for the dependency, where the value of the optional revision identifier specifies a desired behavior of the dependency. Multiple versions of the dependency can be available. This enables compatible behavior to non-identical versions of the invoking program and the dependency to be provided to the invoking program.

Revision indicators can be used to override default behavior to ensure compatibility between a version of a program and a version or revision of a dependency of the program. Revision indicators can be stored in a configuration datastore. Annotations can be made to configuration settings or to initialization programs and/or files to provide revision indicators. A version number of the program can be captured. One or more dependencies of the program can be captured. Configuration and/or initialization settings for the program can be annotated to indicate when the default behavior of the dependency is to be overridden to provide alternative behavior. Configuration settings for the program can be annotated to indicate that future revisions to the dependency are to be applied. Annotations can specify a version or revision indicator of a dependency whose default behavior is to be overridden. Annotations can include a series of versions or revisions of a dependency whose default behavior is to be overridden. Annotations can include a range of versions or revisions of a dependency whose default behavior is to be overridden. Annotations can include an annotation that indicates future versions or revisions of the dependency are to be applied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1A:
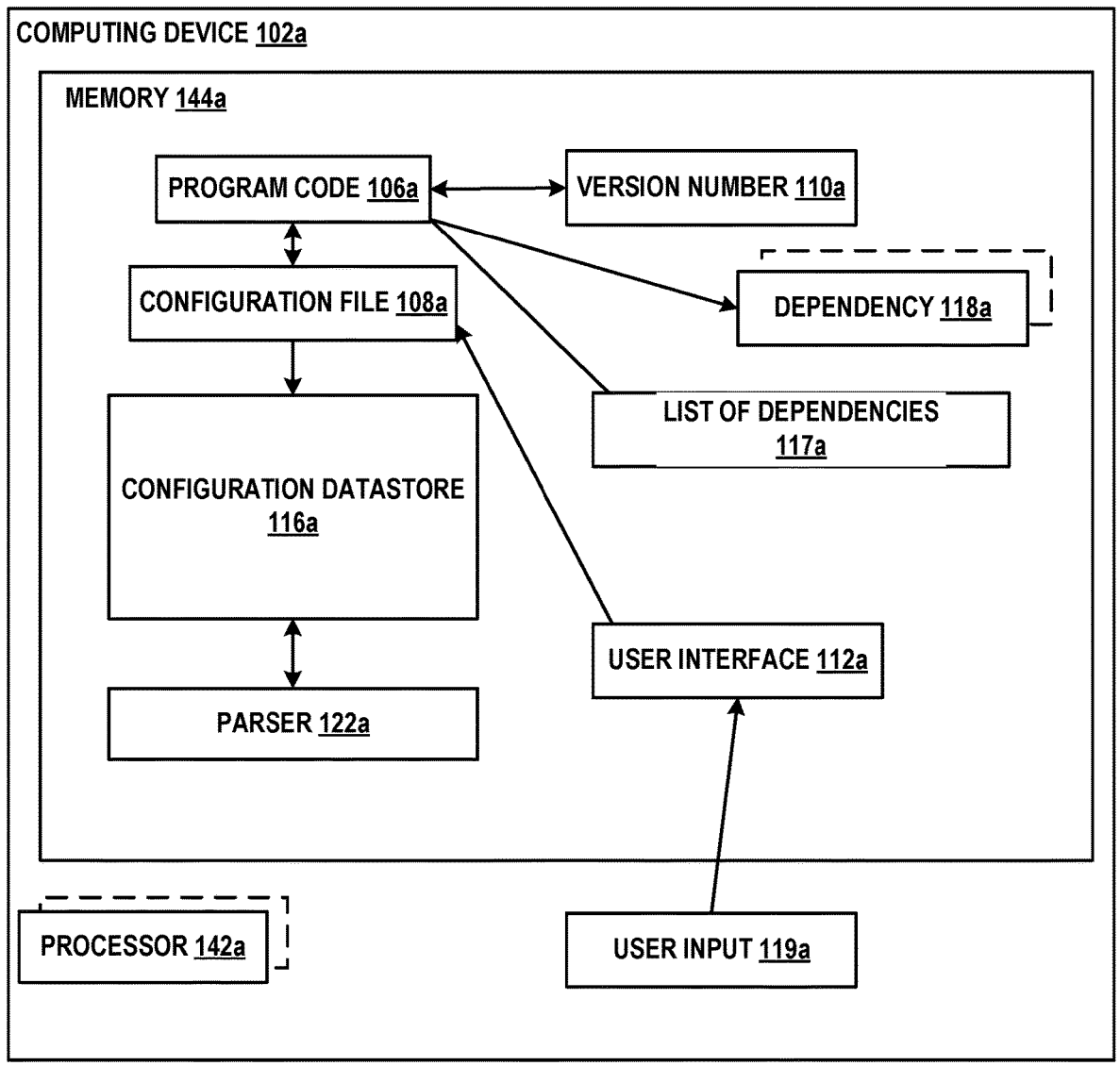
FIG. 1a is a block diagram 100a representing an example of a system for using annotations to control compatibility behavior in accordance with aspects of the subject matter described herein.

An application or program can have dependencies on one or more library resources. When an in-place update of a library or a library resource takes place, the library or library resource is updated without recompiling or rebuilding the program that invokes the library or library resource. When an in-place update of a library or library resource occurs, software incompatibilities can result because the behavior of a library resource can change. For example, an updated library resource that previously returned a particular result may no longer return that result. The invoking program may rely on a particular behavior of the library resource and may operate incorrectly or crash when the library resource no longer provides the expected behavior.

For example, compatibility issues can arise when a program or an application uses library A, version 1 and is deployed with library A, version 1, and subsequently library A is updated to version 2. This is a type of in-place update, meaning the update is applied at the deployment site. The updated library has to include coding that returns the expected version 1 behavior if it is to be backward compatible.

For example, suppose that a program was uses version 1 of method A and is deployed at site S with version 1 of method A. Suppose that the program calls method A and expects method A to return the value "x". Suppose version 2 of method A is created and version 2 of method A has been changed to return the value "y". Version 2 of method A no longer returns the value "x". Now suppose an in-place update replaces version 1 of method A with version 2 of method A at the deployment site S. Now, when the program runs, it calls method A expecting "x", but it receives "y". This can cause the program to behave in unexpected ways or to crash. Version 2 of method A is said to be backward incompatible. Backward compatibility refers to maintaining interoperability with a previous version of a program, application or system. For example, a dependency that provides backward compatibility maintains one or more previous behaviors that the invoking program or application may rely on. One way to implement backward compatibility is to check the value of a compatibility indicator (e.g., a flag or a switch) and, depending on the value of the compatibility indicator, either provide a previous or a newer behavior or behaviors. Forward compatibility refers to software that is written to be compatible with future changes to the software.

Computer programming can be defined as the act of creating a sequence of instructions to enable a computer to do something, such as, for example, to solve a computing problem. A program is written in one or more programming languages and executes in an execution environment or runtime that implements an execution model specified by the programming language.

For example, an execution model specifies what an indivisible unit of work is, and the constraints, if any, that are placed on the order in which the units of work take place. In C (a well-known and widely used programming language), for example, a statement is a portion of syntax terminated by a semicolon, ";". In C, execution of the program proceeds statement by statement. Thus in the execution model of C, statements are indivisible units of work that proceed in the order in which they appear in the code (unless a control statement such as IF or WHILE modifies the order). The execution environment is created by a runtime system that implements the runtime behavior of the execution model. Runtime behaviors are behaviors that are dynamically determined during execution. Such behaviors can include but are not limited to putting parameters onto a stack before a function call, handling input and output to disk, and many others.

The runtime system may also perform supporting activities such as type checking, debugging, generating code and so on. The runtime system controls how a running program interacts with the runtime environment. For example, the runtime environment created by the runtime system can give the executing program access to state values and other information for use by the program.

Compatibility issues can arise when a program is compiled in one execution environment by one runtime system and tries to execute in an execution environment created by a second runtime system that differs from the one in which the program was compiled. This can happen, for example, when the program is compiled and deployed with one version of runtime system and then the runtime system at the deployment site is updated to a second version of the runtime system. Updating the runtime system without recompiling the program (or rebuilding the codebase) is called in-place updating of the runtime system. In-place updating of the runtime system can result in undesirable behavior or can cause the program to crash. When this happens, the updated runtime system is said to be "backward incompatible" with the program.

Suppose that a program was compiled using runtime system version 1. Suppose that the program calls method A and expects method A to return the value "x". Suppose runtime system version 2 includes method A but in runtime system version 2 method A has been changed to return the value "y". Now suppose the runtime system where the program is deployed is updated in-place to version 2 so that now when the program runs, when it calls method A expecting "x", it receives "y". This can cause the program to behave in unexpected ways. For example, the program can crash or can throw an exception. While no exception was thrown before the in-place update, after the update because of the change in behavior of method A version 2, an exception can be thrown. If the exception is unexpected, a crash may result.

In computer programming, a software framework is an environment in which software that provides generic functionality can be augmented by code written by a user to enable customized software to be developed. A software framework typically provides a standard way to build and deploy applications. The software in the software framework is reusable and provides particular functionality as part of a larger software platform to facilitate development of software applications. A software framework can include support programs, compilers, code libraries, tool sets, and application programming interfaces (APIs). A user can extend the framework by writing user code to provide customized functionality. Typically, the framework code can be extended but cannot be modified.

A system virtual machine (VM) is an emulation of computer hardware in software. A virtual machine can provide the functionality needed to execute one or more operating systems. A hypervisor can use provide multiple environments which are isolated from one another on the same physical machine. A process virtual machine can execute computer programs in a platform-independent environment. Virtualization enables the resources of a computer to be partitioned into multiple isolated user space instances, (sometimes called containers) that can appear to an end user to be a physical computing device. A well-known example of a process VM is Microsoft's .NET® which can be used in a wide variety of computing platforms from embedded devices and mobile phones to enterprise servers and supercomputers.

In accordance with some aspects of the subject matter disclosed herein, the library including libraries that the application depends on exist in a particular location which is typically updated either by the software framework (e.g., .NET Framework, Java Runtime Environment, etc.) upgrades and patches or by operating system (OS) upgrades.

The subject matter disclosed herein may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

The subject matter disclosed herein can operate in any of the environments described above. As described more fully below, desired forward and/or backward compatibility processing between a program and its dependencies can be designated using compatibility indicators such as but not limited to annotations. An annotation as used herein is an instruction that is added to a configuration setting to refine the results of the setting. Compatibility indicators can be used to override default behavior to ensure compatibility between versions of a program and versions or revisions of a dependency of the program. Compatibility indicators and/or annotations to configuration settings or initialization programs and/or files can be made. Compatibility indicators and/or annotations can be made by a user via a user interface as described more fully below. Compatibility indicators and/or annotations can be used to prevent unexpected behaviors, exceptions and/or crashes by controlling compatibility behaviors when a program and its dependency or dependencies are distributed separately or whenever the invoking program and its dependency or dependencies are updated separately (e.g., at different points in time).

In accordance with some aspects of the subject matter described herein, a version number of the invoking program can be captured. One or more dependencies of the program can be captured. Compatibility indicators can be set to indicate that default behavior of the dependency is to be overridden to provide previous behavior to maintain backwards compatibility. Configuration and/or initialization settings for the program can be annotated to indicate that default behavior of the dependency is to be overridden to provide previous behavior to maintain backwards compatibility. It will be appreciated that the reverse is also true. That is, for example, configuration and/or initialization settings for the program can be annotated to indicate when default behavior of the dependency is to be overridden to provide new behavior. Alternatively, configuration and/or initialization settings for the program can be annotated to indicate when the new (updated) behavior of the dependency is to be provided. Compatibility indicators can be provided and/or configuration settings for the program can be annotated to indicate when future revisions to the dependency are to be applied. It will be appreciated that the reverse is also true. That is, for example, configuration settings for the program can be annotated to indicate when future revisions to the dependency are not to be applied.

Compatibility indicators, and/or annotations can include a version or revision of a dependency whose default behavior is to be overridden or is to be provided. Compatibility indicators and/or annotations can include a series of versions or revisions of a dependency whose default behavior is to be overridden or is to be provided. Compatibility indicators and/or annotations can include a range of versions or revisions of a dependency whose default behavior is to be overridden or is to be provided. Compatibility indicators and/or annotations can include an indicator that signifies that future revisions of the dependency are to be applied. It will be appreciated that the reverse is also true.

In accordance with aspects of the subject matter disclosed herein, the version of the invoking program can be captured. One or more dependencies of the program can be captured. A dependency can itself have one or more dependencies. The version number or revision designation of the one or more dependencies of the program can be captured. The same is true of the dependencies of the dependencies. One way to capture information about dependencies of a program or application is by using attributes. The same is true of the dependencies of the dependencies. In computing, an attribute is a property of an object, element, or file. The term "attribute" can also refer to or set a particular value for a given instance of the attribute. Attributes can be treated as metadata. An attribute can be a property of a property. An attribute of an object usually comprises a name and a value. An attribute of an element typically comprises a type or class name. An attribute of a file typically comprises a name and extension.

One way to provide backward compatibility is to keep track of what version of the library a program was compiled against and what code changed in any updated versions of the library. If the program was compiled against version 1 of the library and the library is updated in-place to version 2, the version numbers of the library the invoking code was compiled against and the version of the library in which the dependency is located can be compared. If the program is associated with a previous version, only the old behavior of the backward compatible code component (returning "x" not "y" for method A in the example above) can be provided. Alternatively, the user can be provided with the option to receive the new behavior or to not receive the new behavior.

But suppose the new behavior of the updated code includes several behaviors, some of which the user wants to receive and some of which the user does not want to receive. Suppose the behavior is related to a particular area such as security and the changes to the security behavior spans versions (occurs in version 2 through 5). Suppose the user wants to receive all known and future updates in a particular area.

In accordance with aspects of the subject matter disclosed herein, configuration indicators can be used to provide instructions to a backward compatible dependency to designate that previous, backward compatible, behavior of the dependency is desired. Configuration indicators can be provided in configuration settings to provide instructions to the dependency to ensure backward compatibility of a program compiled under one version of a runtime with a dependency compiled under a different version of the runtime is maintained. When a program is executed, and a backward compatible dependency of the program is invoked, compatibility indicators can be accessed to determine what behavior the backward compatible dependency returns to the invoking program. The backward compatible code component (e.g., method or API) can be invoked, the configuration settings for the invoking program for the dependency can be accessed and can be provided to the backward compatible code component and the backward compatible code component can execute based on the value(s) returned.

In accordance with some aspects of the subject matter disclosed herein, information about which version of the runtime system the program was compiled against can be captured at build time. The version of the runtime system that a program or application is compiled against is referred to herein as the targeted version. In accordance with some aspects of the subject matter disclosed herein, the version of the runtime system the program was compiled against is captured in an assembly level attribute that is persisted in metadata associated with the assembly; however, the versioning information can be captured and maintained with an executable in any suitable way. In accordance with some aspects of the subject matter disclosed herein, information about which version of the runtime system the program expects its dependencies to have been compiled against can be captured at build time. At runtime, the version information of the invoking program and the dependency active in the runtime environment can be compared.

Compatibility indicators that designate what behavior of the dependency is expected can be accessed to determine which behaviors are provided to the program. Examples of the type of contemplated behaviors include but are not limited to how an API works or what output a particular method call returns. The technological improvement provided by the subject matter disclosed herein enables a user to control compatibility processing to avoid incorrect behavior and crashes of software because of incompatibility between an invoking program and an invoked program. Moreover, future behavior of updatable software can be opted into for as-yet unwritten software. Hence, compatible behavior of non-identical versions of the invoking program and dependency can be provided, avoiding software crashes and avoiding incorrect or unexpected behavior of the software. A user can specify one or more compatibility indicators enabling the user to control compatibility behavior of a dependency of an invoking program. The compatibility indicator can include an identifier of the dependency and an optional revision identifier. In some cases, the revision identifier may be identical to a version number. The value of the optional revision identifier can specify the desired behavior of the dependency, where the dependency has multiple versions, thereby providing compatible behavior to non-identical versions of the invoking program and its dependency.

Using Semantic Annotations to Control Compatibility Behaviors

FIG. 1a is a block diagram representing a system 100a for controlling compatibility behavior using annotations in accordance with aspects of the subject matter described herein. All or portions of system 100a may reside on one or more computers or computing devices such as the computers described below with respect to FIG. 3. System 100a or portions thereof may be provided as a stand-alone system or as a plug-in or add-in. System 100a or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100a or portions thereof may be provided as a stand-alone system or as a plug-in or add-in. System 100a may execute wholly or partially within an IDE (integrated development environment) or can execute wholly or partially outside an IDE. An IDE is a software application that typically provides comprehensive facilities to computer programmers for software development. An IDE usually includes a source code editor, build automation tools and a debugger. A version control system may be integrated into the IDE.

System 100a can include one or more computing devices such as, for example, computing device 102a. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102a can include one or more processors such as processor 142a, etc., and a memory such as memory 144a that communicates with the one or more processors.

System 100a may include one or more program modules which when loaded into the memory and accessed by the one or more processors configure the processor or processors to perform the actions attributed to the one or more program modules. System 100a can include one or more of: a program comprising program code such as program code 106a, a configuration file such as configuration file 108a, a version number such as version number 110a, a datastore that stores configuration values for one or more programs such as configuration datastore 116a, a list of one or dependencies such as list of dependencies 117a of the program code 106a, a backward compatible code component such as dependency 118a, a user interface such as user interface 112a and/or a parser for parsing a configuration file 108a in the configuration datastore 116a such as parser 122a.

A version number 110a for program code 106a can be captured. In accordance with some aspects of the subject matter disclosed herein, the version number 110a for the program code 106a can be captured at compilation time. Alternatively, version number 110a can be captured at any time by, for example, accessing the source code which can include a version number or by accessing metadata associated with the program code 106a or in any other suitable way. A list of dependencies for the program code 106a such as list of dependencies 117a can be determined. List of dependencies 117a can include the identity of one or more dependencies such as dependency 118a, etc. List of dependencies 117a can include what version number or revision designation the invoking program expects its dependencies to be. When executed, program code 106a can be loaded into memory 144a. Program code 106a can be associated with compatibility indicators that designate the type of behavior the program code 106a expects from its dependencies. Program code 106a can be associated with a configuration file 108a that includes configuration settings for the program code instance being executed. The configuration file 108a may have changed by user input such as user input 119a since the last time the program code 106a was run. The configuration file 108a may be stored in a configuration datastore such as configuration datastore 116a. A user interface such as user interface 112a can be used by a user to provide user input 119a comprising compatibility indicators to control the behavior of dependencies of the invoking program (program code 106a). A user may change compatibility indicators in response to an in-place update of software which may include changes to dependencies.

The program code 106a can start to execute. The configuration file 108a in configuration datastore 116a can be read by the parser 122a. The parser 122a can determine the desired compatibility behavior for the dependency 118a by reading the configuration file 108a and can return compatibility information to the dependency 118a. The program code 106a can call into dependency 118a. Dependency 118a, etc. can comprise backward and/or forward compatible code. Dependency 118a can include code that analyzes compatibility information returned by the parser 122a to determine results returned to program code 106a.

In accordance with aspects of the subject matter disclosed herein, the parser 122a can process the configuration file 108a. The configuration file 108a can include compatibility indicators. The configuration file 108a can include one or more annotations that designate the compatibility behavior to be performed by the dependency 118a. The annotation can designate a version number or revision number (revision indicator), a version range or revision range or a wildcard indicator. The parser can parse the version or revision number(s), version or revision range [start-end], and/or wildcard notations.

Figure 1B:
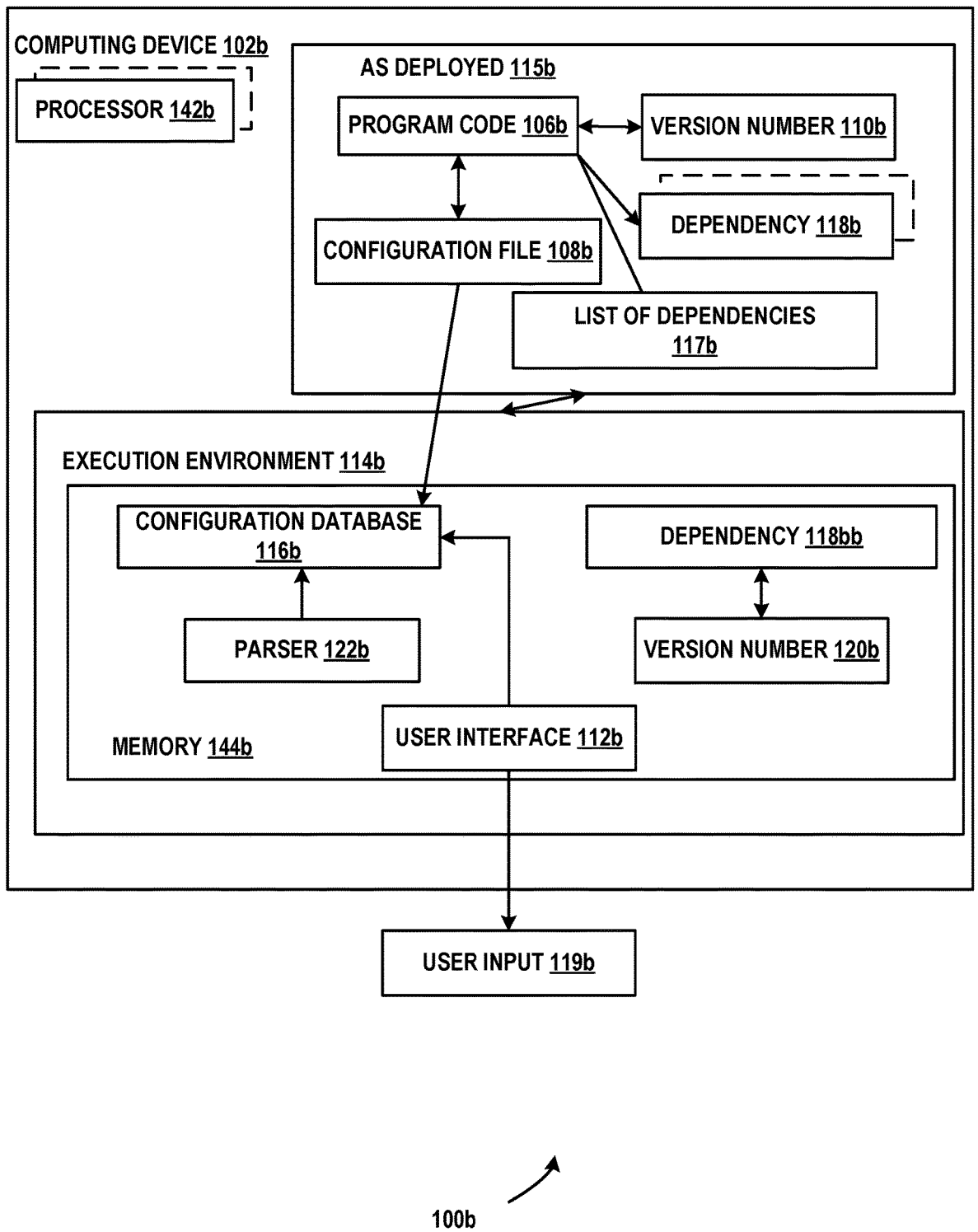
FIG. 1b is a block diagram 100b representing an example of a system for using annotations to control compatibility behavior in accordance with aspects of the subject matter described herein.

FIG. 1b is a block diagram representing a system 100b for designating compatibility behaviors using compatibility indicators in accordance with aspects of the subject matter described herein. All or portions of system 100b may reside on one or more computers or computing devices such as the computers described below with respect to FIG. 3. System 100b or portions thereof may be provided as a stand-alone system or as a plug-in or add-in.

System 100b or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100*b* may execute wholly or partially within an IDE (integrated development environment) or can execute wholly or partially outside an IDE. An IDE is a software application that typically provides comprehensive facilities to computer programmers for software development. An IDE usually includes a source code editor, build automation tools and a debugger. A version control system may be integrated into the IDE.

System 100*b* can include one or more computing devices such as, for example, computing device 102*b*. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102*b* can include one or more processors such as processor 142*b*, etc., and a memory such as memory 144*b* that communicates with the one or more processors.

System 100*b* may include one or more program modules which when loaded into the memory and accessed by the one or more processors configure the processor or processors to perform the actions attributed to the one or more program modules. System 100*b* can include one or more of: a program comprising program code such as program code 106*b*, a configuration file such as configuration file 108*b* associated with the program code 106*b*, a version number such as version number 110*b* for the program code 106*b*, an execution environment such as execution environment 114*b*, a datastore that stores configuration values for one or more programs such as configuration datastore 116*b*, a list of dependences for the program code 106*b* such as list of dependencies 117*b*, one or more dependencies such as dependency 118*b*, etc. comprising a version-compatible code component, a version number such as version number 120*b* for the runtime system, a user interface such as user interface 112*b* and/or a parser for parsing the configuration file such as parser 122*b*.

A version number 110*b* for program code 106*b* can be captured. In accordance with some aspects of the subject matter disclosed herein, the version number 110*b* for the program code 106*b* can be captured at build time. Alternatively, version number 110*b* can be captured at any time by, for example, accessing the source code for program code 106*b* which can include a version number or by accessing metadata associated with the program code 106*b* or in any other suitable way. A list of dependencies for the program code 106*b* such as list of dependencies 117*b* can be determined. The version or revision number of the dependency or dependencies and any of it dependencies that the invoking program, program code 106*b* expects can be captured. List of dependencies 117*b* can include the identity of one or more dependencies such as dependency 118*b*, etc., and the version or revision designation of the dependency expected by the program code 106*b*. Program code 106*b* and its one or more dependencies such as dependency 118*b*, etc. can be deployed at a site (as deployed 115*b*). A user interface such as user interface 112*b* can be used by a user to provide user input 119*b* comprising compatibility indicators to control the behavior of dependencies of the invoking program (program code 106*b*). A user may change compatibility indicators in response to an in-place update of the runtime system. When executed, program code 106*b* can be loaded into memory 144*b* in execution environment 114*b*. Execution environment 114*b* may have changed (e.g., by an in-place update) since deployment of program code 106*b* and dependency 118*b*, etc. Dependency 118*b* may have changed so that execution environment 114*b* loads dependency 118*bb* instead of dependency 118*b*. Program code 106*b* can be associated with a version number 110*b* indicating the version number of the runtime system that it was compiled against. Program code 106*b* can be associated with compatibility indicators stored in a configuration file 108*b* that includes configuration settings for the program code instance being executed in execution environment 114*b*. The configuration file 108*b* may have changed by user input 119*b* via user interface 112*b* since the last time the program code 106*b* was run. The configuration file 108*b* can be stored in a configuration datastore such as configuration datastore 116*b*. A user may change compatibility indicators in response to an in-place update of software which may include changes to dependencies.

The program code 106*b* can start to execute. The configuration file 108*b* can be read by the parser 122*b*. The parser 122*b* can determine the desired compatibility behavior for each dependency in the list of dependencies such as for example, the dependency 118*bb* by reading the configuration file 108*b* from the configuration datastore 116*b*. The parser 122*b* can return compatibility information to the dependency 118*bb*. The program code 106*b* can invoke the dependency 118*bb*. Dependency 118*bb* can comprise backward and/or forward compatible code. Dependency 118*bb* can include code that can receive compatibility information from the parser 122*b* to determine the result to be returned to the program code 106*b*.

In accordance with aspects of the subject matter disclosed herein, the parser 122*b* can process the configuration file 108*b* as described more fully below. The configuration file 108*b* can include one or more annotations that designate the compatibility behavior to be performed by the dependency 118*bb*. The annotation can designate a version number of the runtime under which the program code 106*b* was built, a version number or revision indicator of a behavior of a dependency desired, a sequence of version numbers comprising versions of desired behavior, a range of version numbers, a sequence of revision numbers comprising revisions of desired behavior, a range of revision numbers and/or a wildcard notation, as described more fully below. Parser 122*b* can process the revision indicators (e.g., in configuration file 108*b*) and can generate compatibility information. Parser 122*b* in accordance with aspects of the subject matter disclosed herein, can process the annotations as described more fully below. Parser 122*b* can send the compatibility information to the dependency 118*bb*. In response, the dependency 118*bb* can perform the indicated compatibility processing and return the appropriate information to the invoking program, program code 106*b*.

Figure 2A:
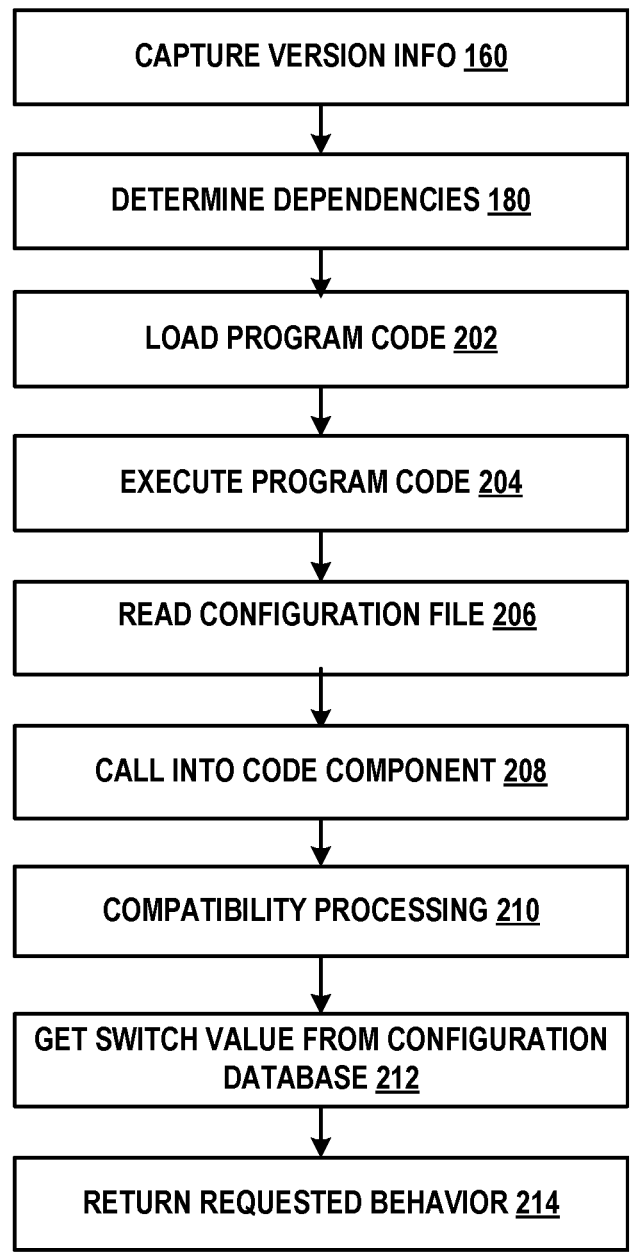
FIG. 2a illustrates an example of a method 200 for using annotations to control compatibility behavior in accordance with aspects of the subject matter described herein.

FIG. 2*a* illustrates an example of a method 200 for using compatibility indicators to control compatibility behavior in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100*a* and/or system 100*b*.

At operation 160 version information can be captured for program code as described more fully above. Version information can include the version of the invoking program. Version information can include the version of the runtime system the invoking program expects to run on. Version information can include the expected version or revision designation of any dependencies and dependencies of the dependencies of the invoking program. Version information can be captured when the program is compiled or when the application to which the program belongs is built. At operation 180, dependencies of the invoking program can be determined. Dependency information can be captured when the program is compiled or when the application to which the program belongs is built. At operation 180 configuration settings for the invoking program can be set as described more fully above. The program code can be associated with a configuration file that includes configuration settings for the program code instance being executed in the execution environment. At operation 202 the program code can be loaded into memory. The configuration file may have changed since the last time the program code was run. At operation 204 the program code can start to execute. At operation 206 the configuration file can be read. The runtime environment can compare the version of the invoking code and the version or revision indicator of each of the dependencies of the invoking program in the execution environment and can inform the dependency that the program is expecting a particular behavior as described more fully below. At operation 208 the program code can invoke the compatible dependency. The compatible code component can be associated with a version number that is different than the version associated with the program code. The compatible code component can be associated with a revision number that is different than the version associated with the program code.

At operation 210 compatibility processing code can be invoked. The compatibility processing code can determine that the version number of the program code differs from the version or revision number of the dependency. The compatibility processing code can determine that the version number of the program code differs from the version number of the runtime system that created the execution environment and can perform semantic versioning processing. At operation 212 the parser can access and parse the value of the compatibility indicator for the program code from the configuration database. Compatibility indicator information can include a true/false value, a series of versions or revisions whose default behavior is to be overridden, a range of versions or revisions whose default behavior is to be overridden, and/or a wildcard indicator that indicates an option to opt in to all future version behavior. At operation 214 the compatibility indicators can be processed and compatibility information can be provided to the dependency. In response the dependency can provide the behavior associated with the parsed compatibility indicators comprising compatibility information to the dependency or dependencies.

Figure 2B:
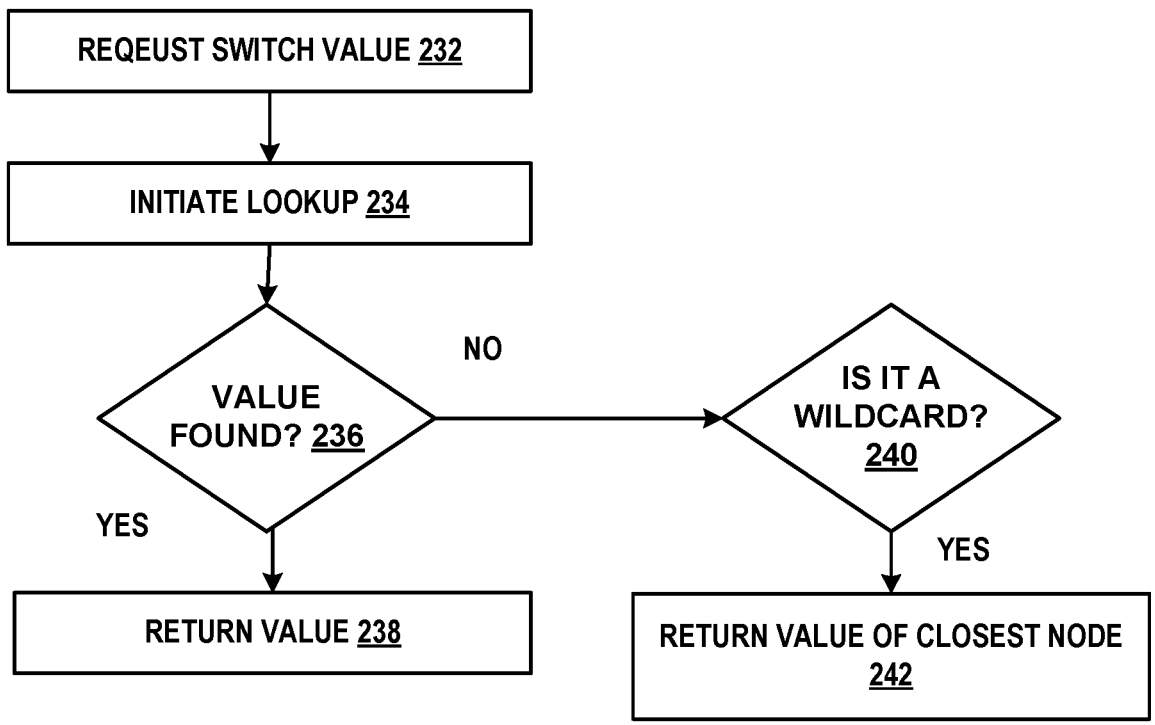
FIG. 2b illustrates an example of another method 220 for using semantic annotations for designating compatibility behavior in accordance with aspects of the subject matter described herein.

FIG. 2b illustrates an example of a more detailed method 220 for a portion of method 200 in accordance with aspects of the subject matter described herein. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated. Method 220 or portions thereof may be executed by a system or a portion of a system such as system 100a and/or system 100b.

At operation 232 a value for a compatibility indicator for a program invoking a dependency can be requested. At operation 234 a lookup operation can be initiated for the compatibility indicator. If the compatibility indicator is found at operation 236, the value of the compatibility indicator can be returned (e.g., from a configuration database, etc.) at operation 238. At operation 236 if a match to the prefix of the compatibility indicator is found, processing can continue at operation 240. Operation 240 determines if the compatibility indicator is a wildcard. If so, the value of the closest node can be returned at 242.

Compatibility processing can include parsing the configuration file for the program code to determine desired behavior of a dependency or dependencies. An opt-out feature can provide uniform configuration processing for updated functionality of the dependency. The opt-out feature can be implemented as a class although other implementations of the feature are contemplated. The configuration feature can establish a loosely-coupled contract between segments of program code to communicate a request to opt out of a specified behavior or group of behaviors. The capability of opting out is typically useful when a change is made to existing functionality of a dependency or dependencies. In the absence of an opt-out request, in accordance with some aspects of the subject matter disclosed herein, providing the new functionality is the default behavior. It will be appreciated that alternatively, the reverse can be true.

A compatibility indicator can be defined to allow consumers of the software to opt-out of a change of behavior of a dependency. In accordance with some aspects of the subject matter disclosed herein, the compatibility indicator value element comprises the name of a compatibility indicator and its Boolean value. By default, the compatibility indicator can be set to false, which provides the new behavior (and makes the new behavior opt-in by default). Setting the switch to "true" can enable legacy behavior to be provided. It will be appreciated that the reverse can also apply, that is, setting the switch to true can provide the updated behavior and setting the switch to false can provide the previous behavior. Similarly, the default can be either to set the switch to true or false.

For example, to opt in to a backward compatible behavior a statement such as:

Switch.Namespace.Feature.Change=true can be added to the configuration file for the program. The "Switch" portion of the statement can identify that the statement is a compatibility indicator, the "Namespace" portion of the statement can identify the context to which the compatibility indicator applies. An example of a namespace is a directory. Each name in a directory uniquely identifies one file or subdirectory. The same file or a different file may have the same name multiple times in different directories. The "Feature" portion of the statement comprises a feature identifier that can identify the dependency to which the configuration setting applies. The "Change" portion of the statement can identify that the behavior of the dependency has changed in a revision of the dependency. Finally the "=true" portion of the statement can set the value of the compatibility indicator to the Boolean value "true". In accordance with some aspects of the subject matter disclosed herein, a value of "true" means that the override behavior is opted into and that a previous behavior of the dependency is to be returned to the invoking program. It will be appreciated that although an example of one possible statement format is provided, other formats of the statement are contemplated. The statement:

Switch.Namespace.Feature.Change.2=true;

can signify that the behavior of the version of the dependency that is desired is the behavior associated with the version provided in revision 2 of the dependency. Multiple versions of the dependency may be created before there is a revision of the dependency. The "2" in the above statement enables the dependency to determine what version of the dependency has the desired behavior and in response, the dependency can return the behavior of that version or revision of the dependency to the invoking program.

If opting in all the programs and applications executing on a computing device is intended, a key-value pair for the compatibility indicator can be added to a configuration datastore. A configuration datastore can include key-value pairs that can enable any application running on the computing device to use the value specified in the configuration datastore for that particular compatibility indicator. Creating a key-value pair in the configuration datastore can be a global-configuration feature analogous to setting the value of the compatibility indicator in the configuration file for every application executing on the computing device. Hence, any application running on the computing device will use the value specified in the configuration datastore for that switch. This is equivalent to setting the value of the switch in each configuration file for each program running on the computing device.

In accordance with aspects of the subject matter disclosed herein, a range of values can be specified. For example, in the configuration file, a statement such as:
    Switch.Namespace.Feature.[1-3]=true
can be resolved to:
    Switch.Namespace.Feature.1=true;
Switch.Namespace.Feature.2=true;
    Switch.Namespace.Feature.3=true
by the parser, meaning that backward compatible behavior is desired for revisions 1, 2 and 3 of the dependency identified by the Feature portion of the statement. That is, the compatibility indicator semantics associated with the [start-end] notation corresponds to explicitly spelling out the names of the compatibility indicators. In accordance with aspects of the subject matter disclosed herein the value is the part following the equals sign.

In accordance with aspects of the subject matter disclosed herein, a wildcard notation in a statement such as:
    Switch.Namespace.Feature[*]=true
indicates that any compatibility indicators that have a name starting with "Switch.Namespace.Feature" are set to the value true. Statements such as the examples provided above can be added to the configuration datastore. The configuration datastore can be a hierarchical database that stores settings for the operating system and for applications that use the configuration datastore. The kernel, device drivers, services, security software, and user interfaces may access and use the configuration datastore.

The configuration datastore can include information, settings, options, and other values for programs and hardware. When a program is installed, a new subkey including settings including but not limited to the location of a program, the version of the program, instructions for initiation of the program and so on can be created. The configuration datastore may include information included in initiation files (e.g., .ini files). A consistent format for switch names can be used. One such contemplated format is:
    Switch.namespace.switchname
It will be appreciated that other formats for the statement are contemplated.

The value of the switch can be obtained by accessing a datastore accessible during execution of the program. The datastore can include configuration data. The configuration data may be accessible via an index. The configuration data can be indexed by keys. Programs can retrieve and store configuration data in the database. In accordance with some aspects of the subject matter disclosed herein, the database is a system-defined database. The data stored in the database may vary depending on the version of the runtime system. When the runtime runs an application, the compatibility settings of the configuration database can be read. The configuration file of the program can be read to populate the configuration options for the instance of the program being executed.

Switches can be closely related to a particular release to enable the switches to be clearly documented and easily understood. Each switch can be individually changed if the behavior the switch introduces is not desired. Related switches may span one or more releases. For example, some features cannot be added in totality in a single release and so may span (be included in) more than one release. Some kinds of bugs cannot all be fixed in a single release and so bug fixes may be included in more than one release. Consistent naming conventions for these types of situations increase clarity and improve understandability.

As an example, suppose accessibility bugs or features are a type of issue that was addressed in a previous version and for which backward compatible behavior has been provided. To continue to address accessibility bugs and to make them configurable, it would be helpful to keep the name of switches related to accessibility close enough between releases to allow users to understand they are related.

A user may want to opt into a class of changes in a particular area. A user may, for example, want to opt in to any changes related to Security or Cryptography. To address these considerations, an indicator can be placed at the end of a switch name. For example, a notation such as but not limited to "[.*]" can be placed at the end of a switch name. For example, a switch can be defined as:
    Switch.Namespace.Feature.Change[*]=true;
meaning that any future versions for that change are opted in to. This enables a user to automatically opt in to future revisions of that change, providing forward compatibility.

In accordance with some aspects of the subject matter disclosed herein, multiple overlapping ranges can be specified. For example, suppose there are 10 versions for a switch. Perhaps only some ranges for the switches are to be enabled. The statement:
    Switch.Namespace.Feature.Change[1-3]=true;   Switch.Namespace.Feature.Change[5-7]=true;
can be equivalent to having the following switches enabled:
    Switch.Namespace.Feature.Change.1=true;
    Switch.Namespace.Feature.Change.2=true;
    Switch.Namespace.Feature.Change.3=true;
    Switch.Namespace.Feature.Change.5=true;
    Switch.Namespace.Feature.Change.6=true;
    Switch.Namespace.Feature.Change.7=true;
    Ranges can overlap. The statement:
    Switch.Namespace.Feature.Change[1-10]=true;   Switch.Namespace.Feature.Change[4-7]=false;
    can be equivalent to the following:
    Switch.Namespace.Feature.Change.1=true;
    Switch.Namespace.Feature.Change.2=true;
    Switch.Namespace.Feature.Change.3=true;
    Switch.Namespace.Feature.Change.4=false;
    Switch.Namespace.Feature.Change.5=false;
    Switch.Namespace.Feature.Change.6=false;
    Switch.Namespace.Feature.Change.7=false;
    Switch.Namespace.Feature.Change.8=true;
    Switch.Namespace.Feature.Change.9=true;
    Switch.Namespace.Feature.Change.10=true;

To opt in to all the changes in a given area, existing and future, a wildcard can be provided as follows:
Switch.Namespace.[*]=true
meaning that all of the specified switches under that namespace will be opted into. If a backward compatible code component is explicitly specified, the explicitly specified code component can be excluded, as follows:
Switch.Namespace.[*]=true;
Switch.Namespace.Feature=false
meaning that for all the switches defined that start with the "Switch.Namespace." prefix the value "true" will be used, except for the "Switch.Namespace.Feature" statement for which the value "false" would be used.

Figure 2C:
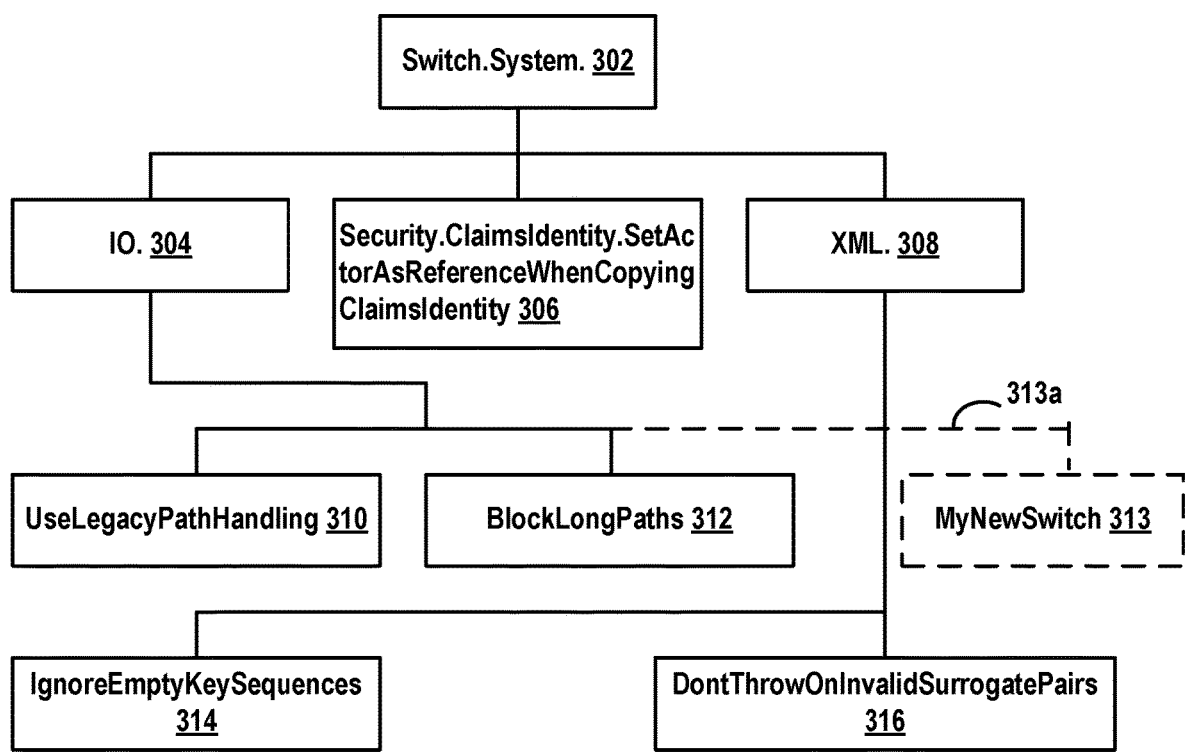
FIG. 2c illustrates an example of a radix tree 300 for using annotations to control compatibility processing in accordance with aspects of the subject matter described herein.

Switch names can be stored in a Radix tree. A Radix tree is a type of tree that is optimized to use less space. Common prefixes are only stored once. Each node of the tree can store a value. FIG. 2c illustrates an example of a radix tree 300 in accordance with aspects of the subject matter disclosed herein. Each box represents a node in the Radix tree. As will be appreciated, there is no duplication in the strings stored in the nodes. The following is another representation of the Radix tree 300:

Switch.System.
  IO.
    UseLegacyPathHandling
    BlockLongPaths
  Security.ClaimsIdentity.SetActorAsReferenceWhenCopyingClaimsIdentity
  XML.
    IgnoreEmptyKeySequences
    DontThrowOnInvalidSurrogatePairs The level of indentation above indicates the nodes which share a parent. For example, the node "IO.", node 304, the node "Security.ClaimsIdentity.SetActorAsReferenceWhenCopyingClaimsIdentity", node 306 and the node "XML.", node 308 all have node "Switch.System." node 302 as their parent node. In accordance with some aspects of the subject matter described herein, the Radix tree can support the operations of addition and lookup.

The addition operation can be used when the value of a switch is stored in the configuration database. When a value is added to the tree, the code first walks the tree (like in a look-up operation). The lookup can result in one of the following 3 cases. The name of the switch fully matches an existing entry. In this case, nothing is added to the tree. The name of the switch fully matches a node, but matches none of the children. For example, "Switch.System.IO.MyNewSwitch" is added to the radix tree 300). In this case, a child node with value "MyNewSwitch" can be added to the "IO." node, as illustrated by node 313 and hashed connector line 313a. The third case is when the name of the switch partially matches a node. In this case, the node can be split into 2 nodes. The two nodes into which the node is split comprise a node with the common part of the name (the part that matches) and a node with the new part (the part that does not match) which can be added to the common node as a child node. The unmatching part of the string being added to the radix tree can be added to the common node.

Figure 2D:
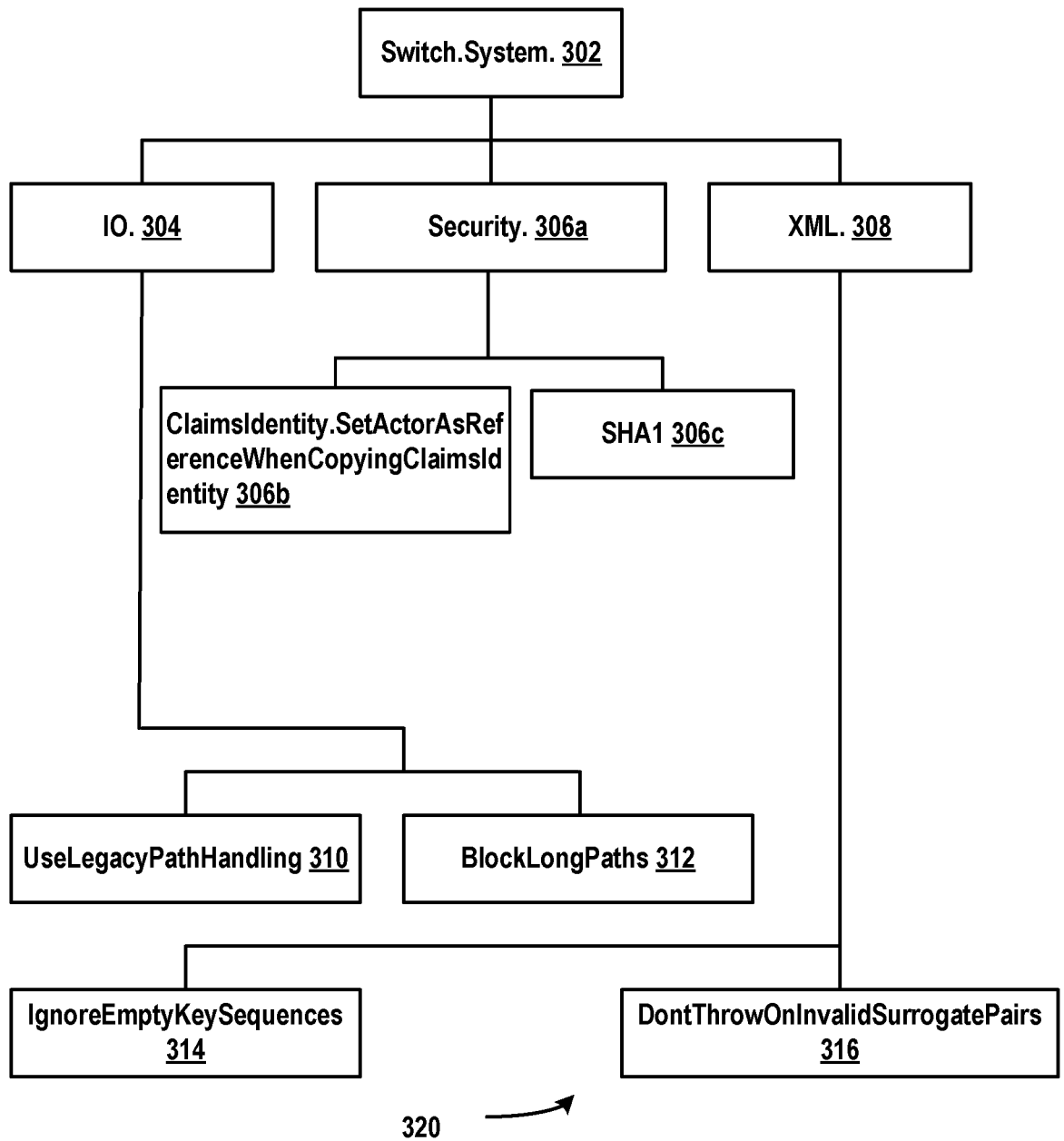
FIG. 2d illustrates an example of a radix tree 320 for using annotations to control compatibility processing in accordance with aspects of the subject matter described herein.

For example, suppose "Switch.System.Security.SHA1" is being added to the tree above. The linear representation of the new tree (illustrated in FIG. 2d) is as follows. Node 306 of FIG. 2c has been broken up into nodes 306a, 306b and 306c.

Switch.System.
  IO.
    UseLegacyPathHandling
    BlockLongPaths
  Security.
    ClaimsIdentity.SetActorAsReferenceWhenCopyingClaimsIdentity.
    SHA1
  XML.
    IgnoreEmptyKeySequences
    DontThrowOnInvalidSurrogatePairs Finally the terminal node is set to the value indicated.

The lookup operation can be used to query the value of a switch. When a switch value is requested a match to a query such as, for example, Switch.System.IO.BlockLongPaths, node 312, the lookup can start at the root of the tree and try to match (character by character) the requested switch name. The prefix "Switch.System." (node 302) first will be searched. Then the children of node 302 will be searched and so on.

The search for a string in a Radix tree can return a match or no match. If the input string can be completely matched, the value for the switch can be obtained. If, alternatively, no match is found, no value for the switch can be obtained. In accordance with aspects of the subject matter disclosed herein, the described radix tree can be used to implement the configuration datastore. Use of a radix tree allows for space-optimized storage of switches (since switches have common prefixes). The radix tree implementation enables intermediate nodes. An intermediate node is any node that is not a root node or a leaf node.

When the switch name that includes the wildcard notation ([*]) is specified in the configuration file, a "wildcard" enumeration can be added into the tree for the specified prefix. For example, suppose the following switches are specified in the configuration file for a program:
Switch.IO[*]=true; Switch.XML.BlockLongPaths=false;
Switch.System.
  IO. (value=true, wildcard)
    BlockLongPaths (value=false)

When the value of the "Switch.System.IO.BlockLongPaths" is requested, the value "false" will be returned. When the value of the "Switch.System.IO.Foo" is requested, the switch name will not be found. However, because the closest "IO" node is a wildcard node and has the value "true", the value "true" can be returned for the value of "Switch.System.IO.Foo".

Described herein is a computing device comprising at least one processor, a memory connected to the at least one processor, the at least one processor configured to access a user-defined compatibility indicator to control compatibility behavior of a dependency of an invoking program, the compatibility indicator comprising an identifier of the dependency and an optional revision identifier, a value of the optional revision identifier specifying a desired behavior of the dependency, the dependency having multiple versions; and providing compatible behavior to non-identical versions of the invoking program and the dependency. The compatibility indicator can comprise a value designating that behavior of future versions of the dependency are provided to the invoking program. The compatibility indicator can comprise a value specifying backward compatible behavior of the dependency is provided to the invoking program. The compatibility indicator can include an annotation to a configuration file associated with the invoking program. The compatibility indicator can override default behavior of the dependency. The compatibility indicator can comprise a non-sequential range of values. The compatibility indicator can override default behavior of the dependency to provide compatibility between a version of a program and a version of a dependency of the program, wherein the version of the program and the version of the dependency of the program differ. The dependency can be part of a software framework.

Described herein is a method of providing compatibility between non-identical versions of software comprising the operations of capturing a version of an invoking program by a processor of a computing device, invoking a dependency of the invoking program, comparing a version of the invoking program with the version of the dependency, in response to determining that the version of the invoking program and the version of the dependency differ, parsing at least one compatibility indicator associated with the invoking program, returning compatibility processing instructions to the dependency and returning compatible behavior of the dependency to the invoking program. Forward compatibility can be provided between non-identical versions of software by using a wildcard notation. Backward compatibility between non-identical versions of software can be provided by using a notation that overrides default behavior of the dependency. Behavior associated with a previous version of the dependency can be provided to the invoking program from an updated version of the dependency. Backward compatibility between non-identical versions of software can be provided by using a notation that overrides default behavior for a range of behaviors.

Described herein is a system that controls compatibility processing using annotations to a configuration file, the system comprising a memory, at least one processor connected to the memory, the at least one processor configured to control compatibility behavior by providing instructions to an invoked program to override default behavior to return specified legacy behavior to the invoking program using a compatibility indicator comprising a feature identifier and a revision indicator. The invoking program can be compiled under a first version of a runtime system and the invoked program can be compiled under a second version of the runtime system, wherein the first version and the second version differ. An annotation of the annotations can specify a range of versions of the invoked program whose default behavior is to be overridden and the specified legacy behavior can be provided to the invoking program. Multiple versions of the invoked program can exist. A radix tree can implement annotation processing. Forward compatible behavior can be provided by opting in to behavior of future versions of the invoked program by using a wildcard indicator. In response to failure to find a requested compatibility indicator, a value of a closest node of a radix tree can be returned.

Example of a Suitable Computing Environment

Figure 3:
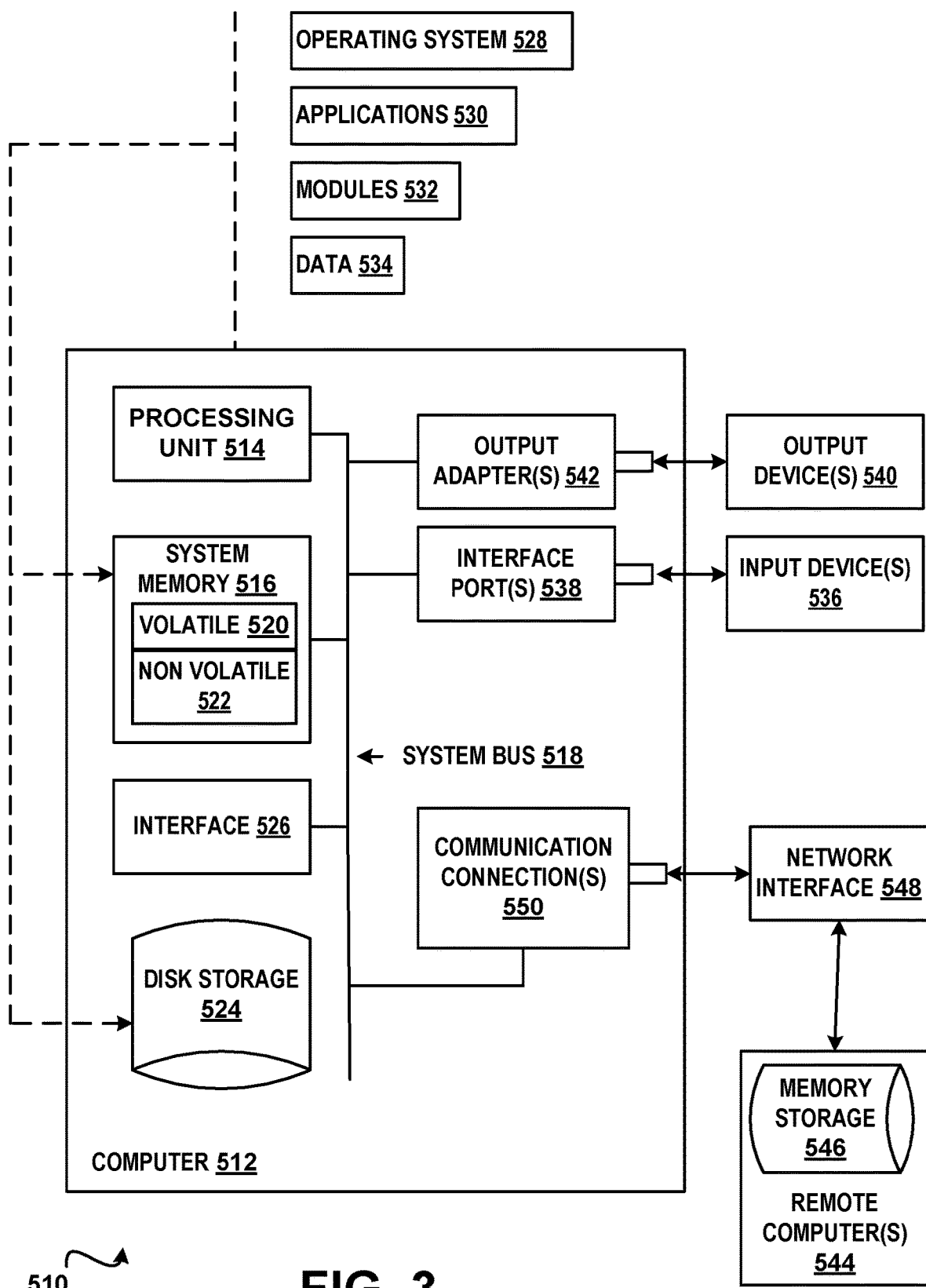
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
   at least one processor:
   a memory connected to the at least one processor, the at least one processor configured to:
   identify a compatibility indicator relating to compatibility functionality of a dependency of an invoking program;
   search a radix tree for the compatibility indicator;
   in an instance when the compatibility indicator is not found in the radix tree, identify a closest node to the compatibility indicator in the radix tree and a value assigned to the closest node; and
   based at least on the value assigned to the closest node in the radix tree, provide compatible behavior of the dependency to the invoking program.

2. The computing device of claim 1, wherein the value designates that behavior of future versions of the dependency are provided to the invoking program.

3. The computing device of claim 1, wherein the value specifies that backward compatible behavior of the dependency is provided to the invoking program.

4. The computing device of claim 1, wherein the value assigned to the closest node comprises an annotation to a configuration file associated with the invoking program.

5. The computing device of claim 1, wherein the processor is configured to:
   override default behavior of the dependency based at least on the value assigned to the closest node.

6. The computing device of claim 1, wherein the closest node comprises a wildcard indicator.

7. The computing device of claim 1, wherein the invoking program is compiled against a previous version of a library that includes a previous version of the dependency, the computing device has an updated version of the library with an updated version of the dependency, and the processor is configured to:
   based at least on the value, cause the updated version of the dependency on the computing device to behave consistently with the previous version of the dependency.

8. The computing device of claim 7, wherein the dependency is part of a software framework that provides the library.

9. A method performed by a processor of a computing device, the method comprising:
   capturing a version associated with an invoking program;
   identifying a dependency of the invoking program;
   comparing the version associated with the invoking program with a version associated with the dependency;
   in an instance when the version associated with the invoking program and the version associated with the dependency differ:
      searching a radix tree for a compatibility indicator;
      in an instance when the compatibility indicator is not found in the radix tree, identifying a closest node to the compatibility indicator in the radix tree and a value assigned to the closest node;
      returning compatibility processing instructions to the dependency, the compatibility processing instructions based at least on the value assigned to the closest node to the compatibility indicator in the radix tree; and
      returning compatible behavior of the dependency to the invoking program according to the compatibility processing instructions.

10. The method of claim 9, further comprising:
    determining that the closest node includes a wildcard notation; and
    returning the compatibility processing instructions responsive to determining that the closest node includes the wildcard notation.

11. The method of claim 9, wherein the compatible behavior provides backward compatibility between the invoking program and the dependency.

12. The method of claim 9, wherein the returning compatible behavior comprises:
    returning behavior associated with a previous version of the dependency to the invoking program from an updated version of the dependency.

13. The method of claim 9, wherein the returning compatible behavior comprises:
    providing backward compatibility with a previous version of dependency for a range of behaviors of the dependency.

14. A system comprising:
    a memory;
    at least one processor connected to the memory, the at least one processor configured to:
    identify a compatibility indicator relating to compatibility behavior of an invoked program; and
    control compatibility processing of the invoked program by:
       searching a radix tree for the compatibility indicator;
       in an instance when the compatibility indicator is not found in the radix tree, identifying a closest node to the compatibility indicator in the radix tree and a value assigned to the closest node; and
       providing instructions to the invoked program, the instructions causing the invoked program to override default behavior of the invoked program to return specified legacy behavior of the invoked program to an invoking program, wherein the instructions are based at least on the value of the closest node to the compatibility indicator in the radix tree.

15. The system of claim 14, wherein:
    the invoking program was compiled under a first version of a runtime system and the invoked program was compiled under a second version of the runtime system, wherein the first version and the second version differ.

16. The system of claim 14, wherein the at least one processor is configured to:
    control the compatibility processing by:
       identifying an annotation for another compatibility indicator, the annotation specifying a range of multiple versions of the invoked program for which to override default behavior; and
       providing specified legacy behavior to the invoking program for the multiple versions of the invoked program.

17. The system of claim 14, wherein multiple versions of the invoked program exist.

18. The system of claim 14, wherein the closest node comprises a wildcard indicator.

19. The system of claim 18, wherein the at least one processor is configured to:
    traverse the radix tree along a prefix of the compatibility indicator to reach the closest node.

* * * * *